March 27, 1945.　　　G. N. HEIN　　　2,372,325

FEEDING AND ORIENTING METHOD AND APPARATUS

Filed Sept. 15, 1942　　　4 Sheets-Sheet 1

Inventor
GEORGE NORTON HEIN
By Philip A. Minnis
Attorney

March 27, 1945. G. N. HEIN 2,372,325
FEEDING AND ORIENTING METHOD AND APPARATUS
Filed Sept. 15, 1942 4 Sheets-Sheet 2

Inventor
GEORGE NORTON HEIN
By Philip G. Minnis
Attorney

Patented Mar. 27, 1945

2,372,325

UNITED STATES PATENT OFFICE 2,372,325

FEEDING AND ORIENTING METHOD AND APPARATUS

George Norton Hein, San Carlos, Calif., assignor to Food Machinery Corporation, San Jose, Calif., a corporation of Delaware Application September 15, 1942, Serial No. 458,444

23 Claims. (Cl. 214—1)

This invention is concerned with a novel method and apparatus for feeding and orienting objects of more or less ovoidal shape so as to arrange and deliver them in uniformly positioned relation with respect to their major axis.

Olives, for example, are of the general shape referred to, and one of the principal problems heretofore encountered in the operation of olive pitting machines has been the difficulty of mechanically feeding the olives to the pitting mechanism in such properly and uniformly positioned relation as to insure that the pitting tool will uniformly penetrate the olives along their stem-blossom axis as required for a commercially acceptable product.

My invention is well adapted for use in connection with olive pitters to arrange and deliver the olives in properly and uniformly positioned relation, and hence, for purposes of this disclosure, I shall describe an illustrative embodiment as so employed, it being understood, however, that this is but one of various possible applications, since as will become self-evident hereinafter, the invention may also be utilized for feeding and orienting other more or less ovoidal-shaped articles if desired as well as for purposes other than pitting.

It is therefore the general object of my invention to provide a method and apparatus for feeding and orienting olives or other generally ovoidal-shaped articles so as to arrange and deliver them in uniformly positioned relation with respect to their major axis.

It is also an object to provide such a method and apparatus which is not only rapid and highly effective in operation but is also of a relatively simple, compact and inexpensive nature.

Other objects and advantages of my invention will become more apparent from the following description taken in connection with the accompanying drawings wherein.

It is to be observed that the pitting machine proper is only partially disclosed in the drawings since much of its construction, including the pitting and other mechanisms, form no part of the present invention and their disclosure is unnecessary to a proper understanding thereof. Hence these have been omitted in the interests of clarity and brevity. It may be stated however that so far as disclosed, the pitting machine is of the general character disclosed in the co-pending application of Cecil A. Britten, Serial No. 418,481, filed November 10, 1941, and reference is made to that application for details of construction and operation of the machine as a whole.

Figure 1:
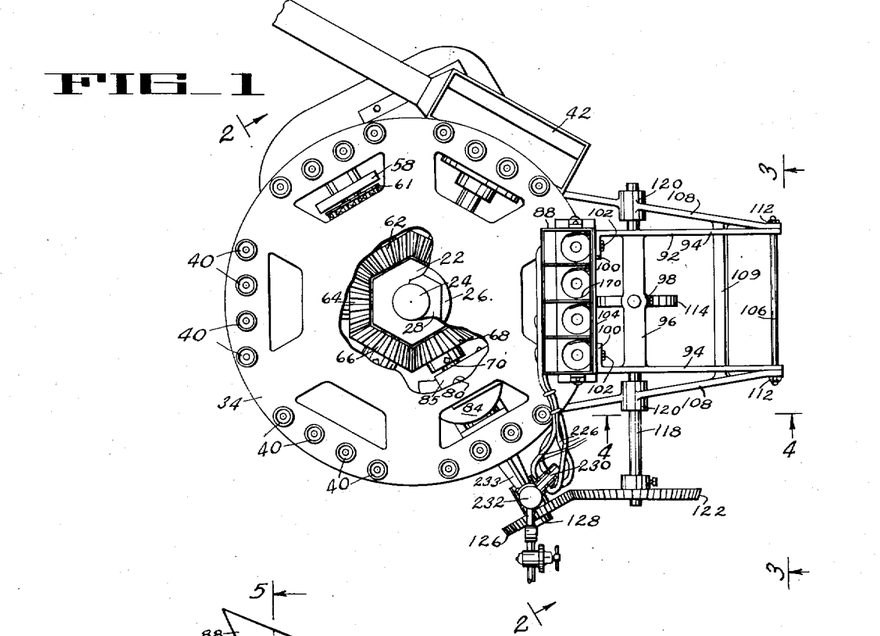
Fig. 1 is a plan view of a portion of an olive pitting machine having the apparatus of my invention associated therewith, some portions of the mechanism being broken away to better illustrate certain of the parts.
Figure 2:
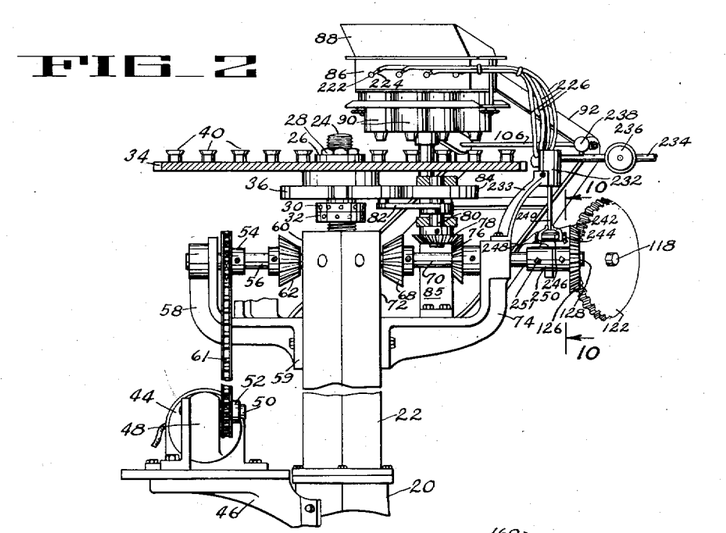
Fig. 2 is a vertical section taken as indicated by the arrow 2—2 in Fig. 1, showing the power drive and indexing mechanism, certain parts being omitted.

As best seen in Figs. 1 and 2 of the drawings the apparatus illustrated is supported by means of a base 20, only the upper portion of which is shown but which is constructed to rest on a floor or other suitable foundation. Bolted to the base 20 is a hexagonally-shaped pedestal 22 for carrying the several mechanisms. Secured in the upper end of the pedestal is a stationary vertical stud shaft 24, having threaded thereon a retaining flange 26, a lock nut 28, an adjusting nut 30 and an adjusting lock nut 32. Freely rotatable and vertically adjustable on the stud shaft 24, intermediate the flange 26 and nut 30 is a circular carrier table 34, having an index plate or gear 36 forming part of a conventional Geneva mechanism through which the table is intermittently driven. The table is provided with a plurality of groups of individual olive holding cups 40 into which the olives are deposited and by which the olives are successively presented to the several mechanisms utilized for or in connection with the pitting operation and for finally discharging the pitted fruit into a discharge hopper 42. As previously mentioned, these latter mechanisms form no part of the present invention and hence have been omitted from the drawings in the interests of clarity.

Power for driving the table is supplied by an electric motor 44, carried on a bracket 46 bolted to the base 20. The motor has a built-in gear reduction unit 48, the output shaft 50 of which has secured thereto a sprocket wheel 52. A further sprocket wheel 54 is keyed to a horizontal shaft 56, one end of which is journaled in an L-shaped arm 58 of a spider bracket 59 secured to the body of the pedestal 22. The other end of the shaft 56 is rotatably journaled in a face 60 of the pedestal. Trained around the sprocket wheels 52 and 54 is a chain 61 for driving the shaft 56 upon operation of the motor 44. Also secured to the shaft 56 is a bevel gear 62 which drives a train of similar intermeshing bevel gears 64, 66 and 68, as best seen in Fig. 1 of the drawings. The bevel gear 68 (Fig. 2) is secured to a horizontal shaft 70, rotatably journaled in a face 72 of the pedestal 22 and in a further L-shaped arm 74 of the pedestal spider bracket 59, previously mentioned. Also fixed to the shaft 70 is a bevel gear 76 that engages a bevel gear 78 secured to a vertical shaft 80 carrying the drive arm 82, and locking disc 84 of the Geneva mechanism, these members engaging the index plate 86 to intermittently drive the table 34. The shaft 80 is rotatably journaled in the vertical bearings of a bracket 85 bolted to the arm 74 of the pedestal spider bracket 59.

Thus, it will be seen that upon operation of the motor 44, shaft 56 will be rotated and in turn will produce rotation of the shafts 70 and 80 through the bevel gearing above described to effect operation of the Geneva mechanism and indexing of the table 34. In the disclosed embodiment the table is indexed 60 degrees for each complete revolution of the Geneva arm 82.

The mechanism for feeding, orienting and delivering the olives to the holding cups 40 with their stem-blossom axis in uniformly positioned relation to the cups, and which for convenience will sometimes be referred to as the positioning mechanism, will now be described.

Figure 3:
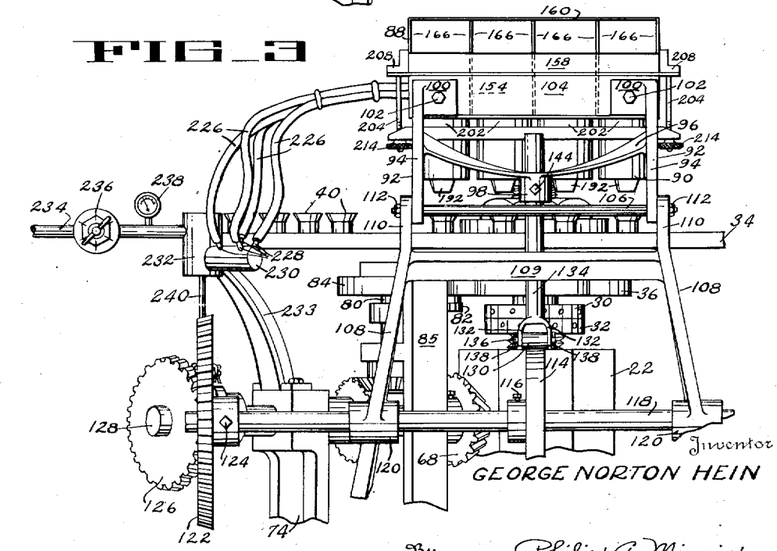
Fig. 3 is a front elevation taken as indicated by the arrows 3—3 in Fig. 1.
Figure 4:
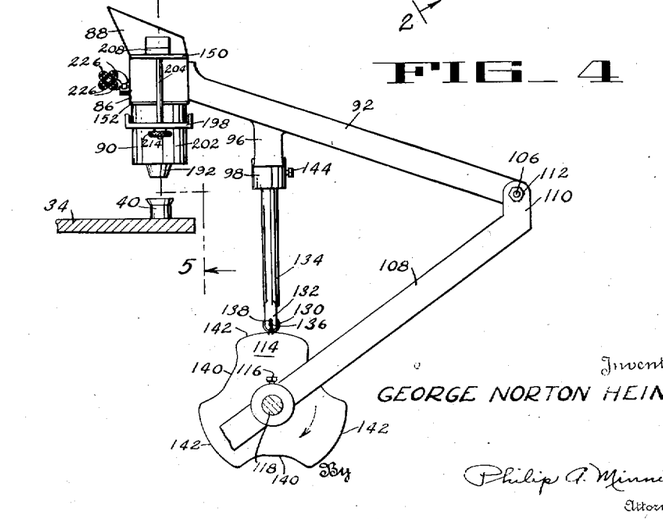
Fig. 4 is a vertical section taken as indicated by the arrows 4—4 in Fig. 1, showing an end elevation of the feeding and orienting mechanism in its "up" position and the cam means for positioning the same.

As generally shown in Figs. 1 to 4 the positioning mechanism comprises a rectangular feeding box 86, provided with a hopper 88 and a delivery structure 90. These components are vertically disposed one above the other and the whole mechanism is mounted upon a rocker frame 92 by which it may be raised and lowered relative to the holding cups 40 when delivering olives, as best seen in Fig. 4. The frame 92 has opposite side arms 94 (Figs. 1 and 3) which are rigidly joined by a curved web 96 carrying a vertical bearing 98. The arms 94 terminate at their upper ends in vertically disposed supporting pads 100 which turn in towards each other from the arms 94 and carry the positioning mechanism by being secured through bolts 102 to the front wall 104 (Fig. 3) of the feeding box. The lower ends of the arms 94 are pivotally mounted on a horizontal rod 106. The rod 106 is carried in a U-shaped bracket 108 stiffened by a rib 109 and provided with upward leg extensions 110 which straddle the arms 94 of the frame 92 and are bored to receive threaded ends of the rod 106. Nuts 112 are secured over the threaded ends of the rod to hold it in place. The base of the bracket 108 is secured to the pedestal spider member 59 in a manner not shown.

As best seen in Figs. 3 and 4, the frame 92 is raised and lowered by a tri-toothed plate cam 114, secured as by a set screw 116 to a horizontal shaft 118 rotatably journaled in opposite bearings 120 of the bracket 108. Secured to the overhanging end of the cam shaft 118 is a bevel gear 122 held thereto by a set screw 124. This gear is driven by a bevel pinion 126 secured to the overhanging end 128 of the shaft 70 of the table drive mechanism previously described from which it receives its power.

A roller cam follower 130 engages the cam 114, and is supported in bearing arms 132 of the forked lower end of a vertical rod 134 by a horizontal pin shaft 136 with which the roller is rotatably journaled. The shaft 136 is mounted in the bearing arms 132 and extends at each side to receive cotter pins 138 to retain it in position. The upper portion of the rod 134 is slidably mounted in the bearing 98 of the rocker frame 92. The rod is therefore adjustable vertically to set the delivery end of the positioning mechanism in proper relation to the olive holding cups when the cam follower is in the bottom of the valley 140 between the teeth of the cam. A set screw 144 is provided in the bearing 98 to lock the rod 134 in its adjusted position.

It will be observed that the cam follower is held in contact with the cam 114 by the weight of the rocker arm 92 and the positioning mechanism attached thereto. Consequently the positioning mechanism is lowered when the roller enters the valleys 140 and is raised when the roller leaves the said valleys of the cam. Moreover, the tops 142 of the cam teeth are preferably on an arc having its radius at the axis of rotation of the cam so that a dwell is obtained following raising of the mechanism to hold the mechanism in its up position. Since the cam shaft 118 receives its power from the motor 44 through the table drive shaft 70 it will be understood that the raising and lowering of the positioning mechanism is in timed relation to the indexing of the table. In the disclosed embodiment the shaft 118 rotates one revolution for every three of the shaft 70 and every three revolutions of the Geneva drive shaft 80. Therefore the cam 114 rotates 120 degrees or one valley 140 and one top 142 of the cam in one revolution of the shaft 70 and one revolution of the Geneva drive arm 82. During part of the rotation of the arm 82 the table 34 is indexed and during the remainder it is held stationary. The operation of the cam 114 is preferably timed so that the cam roller 130 is on a top 142 of the cam and holding the positioning mechanism stationary in its raised position when the table is indexing and such that the roller is in the valley 140 of the cam and lowering and raising the positioning mechanism when the table is stationary.

Figure 5:
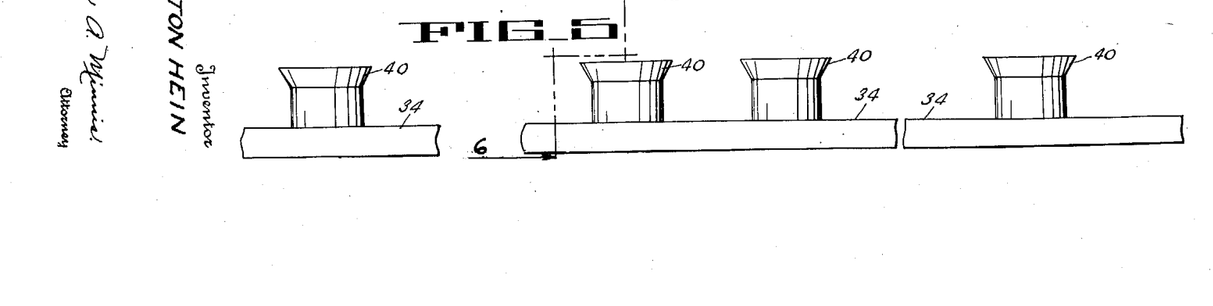
Fig. 5 is an enlarged vertical longitudinal section taken as indicated by the arrows 5—5 in Fig. 4 of the feeding and orienting mechanism.
Figure 6:
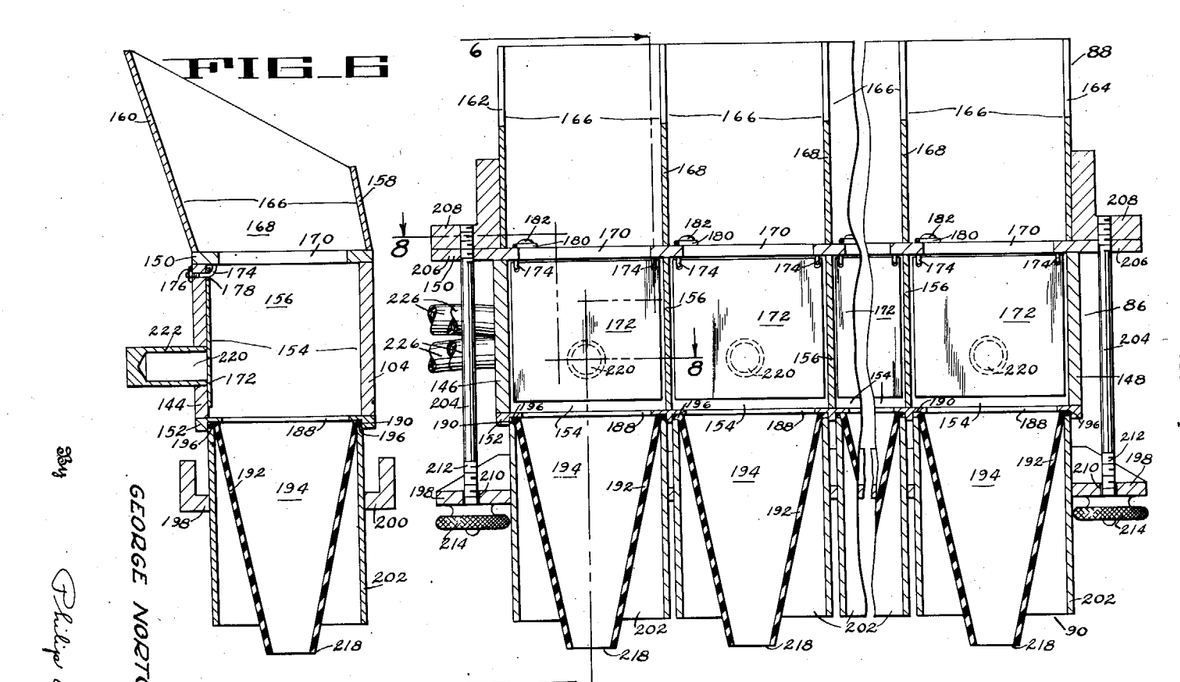
Fig. 6 is a vertical transverse section taken as indicated by the arrows 6—6 in Fig. 5.

The feeding box 86 of the positioning mechanism generally comprises as shown in Figs. 5 and 6, a box-like casing having front and rear walls 104 and 144 respectively, end walls 146 and 148 respectively, and top and bottom walls 150 and 152 respectively, forming one or more olive receiving chambers 154. Four chambers are preferably provided in the present embodiment, this number corresponding to the number of olive holding cups 40 indexed in each position of the table, and to be loaded at one time. Vertical separating walls 156 divide the casing into the requisite number of chambers.

The hopper 88 for the feeding box is an open bottom member of trapezoidal section formed by obliquely positioned front and rear walls 158 and 160 respectively, and end walls 162 and 164 respectively, secured to the top wall 150, of the feeding box casing. The hopper is preferably divided into separate compartments 168 correspondingly arranged to the chambers 154, by vertical separating walls 168 which are aligned with the vertical walls 156 of the chambers.

As shown in Figs. 1, 5 and 6, each chamber 154 connects with its corresponding hopper compartment 166 by a circular opening or passage 170 in the top wall 150 of the feeding box. The opening 170 is of sufficient size to permit passage therethrough in any position of the largest olive to be pitted.

Each opening 170 is preferably closed by a separate light weight rectangular vertically swinging flap valve or trap door 172 which is hung by a pair of hook-shaped pins 174 adjacent the intersection of the top and rear walls of the feeding box.

As best seen in Fig. 6, threaded shanks of the pins 174 are mounted in the wall 144 and secured in position by nuts 176, and openings 178 in the doors are received over the head portions of the pins which curve upwardly to guide the doors when swinging. The openings 178 are sufficiently large to enable the doors to swing freely on the pins. Normally, by reason of gravity the doors hang in the vertical or open position shown in Figs. 5 and 6 abutting the rear wall 144 of the feeding box. However, when actuated by means to be presently described the doors are swung upwardly on the pins to the horizontal position shown in Fig. 7 where they cover the openings 170 to close and seal them.

Figures 8, 9, 10:
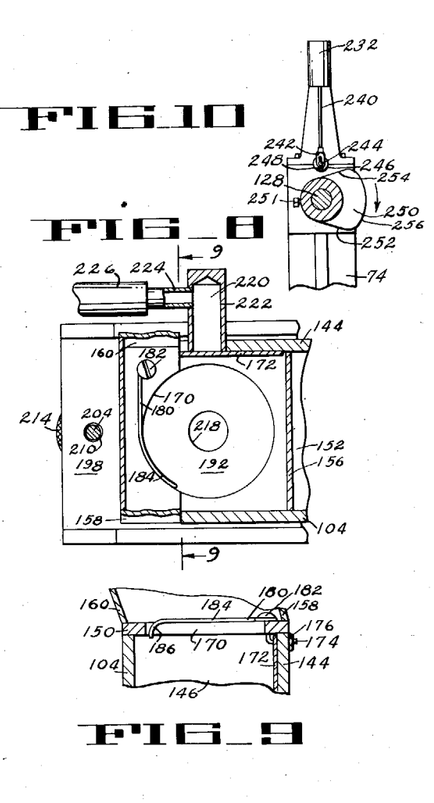
Fig. 8 is a horizontal section taken as indicated by the arrows 8—8 in Fig. 5.
Fig. 9 is a vertical section taken as indicated by the arrows 9—9 in Fig. 8, showing a detail of the chamber closure structure.
Fig. 10 is a vertical section taken as indicated by the arrows 10—10 in Fig. 2, showing a detail of the air valve control cam in its position relative to the valve operating rod during an interval when the valve is closed.

In order to assist gravity in reopening the door 172 when such is desired and prevent the door from sticking in closed position should it become wetted with sticky fluid from olives passing through the chamber, a wire spring 180 is provided in the passage 170, as best shown in Figs. 8 and 9. The spring is secured against the upper face of the top wall 150 of the feeding box by a screw 182. A curved portion 184 of the spring follows the periphery of the opening 170 and terminates in a downwardly bent portion 186 which projects through the opening into the chamber 154. When the door is swung closed and abuts the under face of the upper wall 150 of the feeding box, it strikes the projecting portion 186 of the spring thus placing the spring under tension which subsequently comes into play when the forces acting to maintain the door closed are released.

It will be observed from Figs. 5 and 6 that each chamber 154 is also provided with an exit consisting of a circular opening 188 in the bottom wall 152 of the feeding box casing. This opening preferably corresponds in size to the opening 170 of the feeding box and is located directly opposite it so that it also may pass the largest olive to be pitted. The openings 188 are each counterbored on the underside of the wall 152 to provide receiving recesses 190 for the vertically positioned orienting and delivery member 192 which constitute an important feature of the present invention.

The members 192 each comprise a resiliently expansible tube, preferably straight and of circular section and open at both ends, providing a passageway 194 of such dimension as to require its dilation in order to pass an olive being forced through it and that is adapted to orient the olive during its progress through the passageway such that it may be ejected with its major axis substantially paralleling the axis of the tube. Preferably the upper end of the passageway 194 will be of sufficient size, for instance slightly larger than the chamber exit opening 188, to permit olives to lodge themselves in the tube in any axial position without dilation of the tube, and the lower portion of the passageway will provide a restricted neck or throat, of smaller dimension than the width at its minor axis of the smallest olive to be pitted, requiring dilation of the throat under the sidewise pressure of the olive as it passes through the throat whereby a delayed or dilatory action of the movement of the olive is obtained. The wall of the tube should preferably be of an elastic and durable material such as soft rubber. A material of this character will provide the requisite resiliency to repeatedly conform to the shapes of olives of different size and may also provide a smooth contacting surface substantially impervious to the passage of a fluid medium such as hereinafter described to move the olives through the tubes. The wall may also be relatively thin and soft. Preferably, it will have sufficient resistance to dilation as to provide the desired orienting effect upon the olives and will be stout enough to prevent the tube from bursting before an olive sealed in it is ejected. In practice a soft rubber tube having a wall thickness of about $\frac{1}{16}$" has been used with satisfactory results.

I have also found that a tube having a tapering passageway, for example such as provided by a frustro-conical tube, gives very satisfactory results. A taper of even a slight amount in the surface of the restricted portion of the tube is believed to aid materially in orientation of the olives when they are forced through the tube. The amount of taper to be used will be dictated by the particular objects being handled and the length of the tube possible of use. Best results will however be obtained on olives with a tube having an included angle of less than 30°.

The upper ends of the orienting tubes have outwardly turned flanges 196 by which they are positioned in the recesses 190 of the bottom wall 152 of the feeding box casing and tightly clamped therein by a clamping member 198 to provide a fluid and pressure tight connection with the chambers 154. The clamping member consists of a horizontal channel-shaped bar 200 provided with a series of vertically positioned cylindrical shields 202 spaced at distances corresponding to the spacing of the orienting tubes. Each shield encompasses a single orienting tube and has its upper end bearing against the resilient flange 196 of the orienting tube. Each shield also extends lengthwise of the tube to substantially protect the orienting tube for its entire length and provides a lateral stop for displacement and dilation of the orienting tube.

The clamping member 198 is located in position by vertical studs 204 which are rigidly mounted in and extend downwardly from end extensions 206 of the feeding box casing top wall 150 and to angle pieces 208 by threading into both of these parts. The angle pieces 208 are integrally secured to the wall 150 and also serve to reinforce the hopper ends 162 and 164 to which they are fastened by suitable means.

Clearance holes 210 are provided in the clamping member for receiving the threaded ends 212 of the studs 204. Clamping pressure is transmitted to the flanges 196 of the orienting tubes 192 through the shields 202 by thumb nuts 214 which are screwed over the threaded portions 212 of the studs against the channel bar 200 of the clamp.

In order to force the olives through the orienting tubes and eject them therefrom, I provide for admission into the chambers 154 behind the olives of a fluid medium under pressure, preferably compressed air. Such a medium exerts a continuous and uniform propelling force over the surface of the olive facing upwardly in the tube and permits turning and shifting of the olive while simultaneously progressively urging the olive through the tube. In practice I have found a pressure of about 10 lbs. per square inch above atmospheric to produce satisfactory results.

Figure 7:
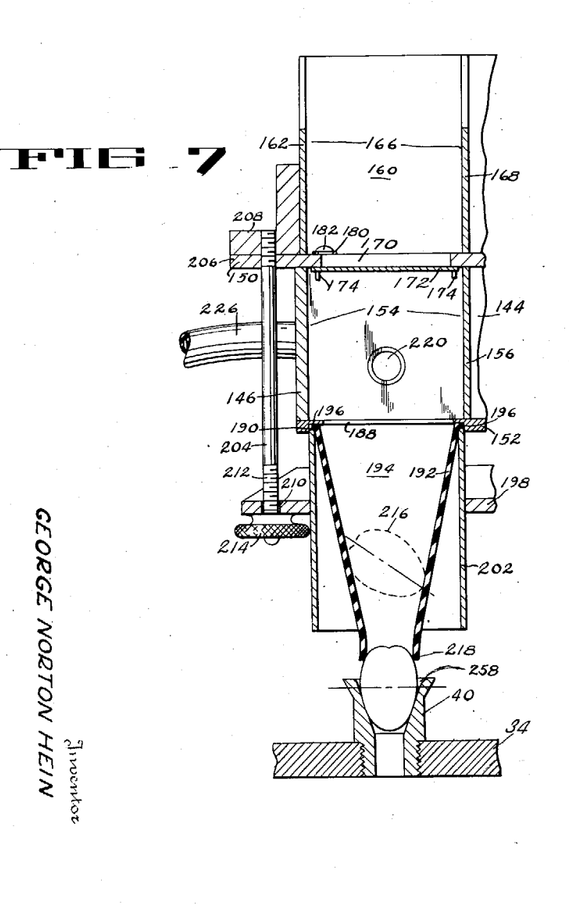
Fig. 7 is a section similar to that in Fig. 6 showing a unit in process of discharging an olive.

If the olive is first lodged in the orienting tube with its major axis oblique to the axis of the tube as illustrated by the dotted outline 216 of an olive in Fig. 7, the end portion of the olive will be in contact with the wall of the tube at opposite sides of the passageway, while there will be gaps between the side portions of the olive and such wall. Moreover, one point of contact will generally be higher than the other. In these circumstances the compressed air will exert a uniform surface pressure on the olive and act upon the surface of the olive to urge it forward and will tend to distend the tube at the areas of contact shown, the effect thereof being that laterally acting opposite forces are set-up by the tube creating a turning moment to cause turning of the olive toward a position with its long axis paralleling that of the tube the air pressure readily permitting such turning moment. Moreover, due to the ovoidal-shape of the olive it is believed that the compressed air itself also tends to turn the olive with its major axis in the desired position. While some of the air will by-pass the olive it is found that this condition is only temporary and does not prevent forward and orienting movement of the olive. Thus, as the olive progressively moves or slides along the surface of the passageway through the constricted portion of the tube it is gradually turned by the forces acting upon it until finally when its major axis is substantially parallel to that of the tube it seals the passageway closing off leakage of air and now only slides through the tube under propulsion of the compressed air until it is ejected therefrom. Thus, by the time the olive leaves the tip portion 218 of the tube it will have been oriented to the predetermined position.

In order to reduce the frictional resistance of the passageway to objects being oriented thereby the wall thereof may be sprayed or otherwise treated with a suitable liquid, for instance, an oily substance by suitably positioned devices not shown, or such substance may be atomized by the compressed air and carried into contact with the surface of the object and passageway. However, in the case of olives any such treatment may generally be omitted as the olives are self lubricating to an oily substance which exudes from their surface.

It will be understood that if the olive is initially lodged in the orienting tube with its major axis paralleling that of the passageway it will be propelled forward through it in that position. Also, that depending upon factors of initial positioning and specific shape of the olive either end of the olive may be the first to emit from the orienting tube. It will also be observed that the shields 202 serve to prevent excessive inflation of the orienting tube by the compressed air when pushing an over-sized olive through the restricted portion of the tube after the olive seals the same or when two or more olives obstruct the tube.

The mechanism for feeding compressed air to the chambers 154 will now be described. As best seen in Figs. 5 to 8, each chamber 154 is provided with an air inlet passage 220 that opens into the chamber from the rear wall 144 of the feeding box casing and is normally covered by the gate 172 as seen in Figs. 5 and 8. Each passageway is formed by a tube 222 secured in the wall 144 and projects outwardly normal thereto. The outer end of the tube 222 is closed and each tube has a laterally extending secondary tube 224 that communicates with its passage 220. As shown in Figs. 2 and 8, each tube 224 is connected to a separate flexible air hose 226 which serves to bring the compressed air to the passage 220. Each hose in turn connects through tubular inlets 228 to the discharge side 230 (Fig. 3) of a normally closed poppet valve 232 which controls flow of the compressed air to the chambers 154. The valve is carried by a bracket 233 bolted to the arm 74 of the pedestal spider frame. The inlet side of the valve is connected by a pipe 234 (Figs. 2 and 3) to a source of air under pressure which may be a tank of compressed air or the discharge side of an air compressor. A pressure regulator 236 is placed in the pipe line 234 between the valve 232 and source of air for adjusting the pressure to that required for operation, which usually is about 10 lbs. per square inch above atmospheric. A gauge 238 is also connected to the pipe 234 between the valve 232 and the regulator to visually indicate the amount of pressure at the intake side of the valve.

The valve 232 has a vertical stem or rod 240 depending from it, which upon raising opens the valve to permit air to flow to the feeding box chambers and that normally is held in downward closed position by a spring inside the valve body. As seen in Figs. 2 and 10, this stem has a forked-shaped member 242 fixed to its lower end in the arms of which there is journalled a pin shaft 244 that carries a cam roller 246. Cotter pins 248 at each end of the shaft retain it in place.

The valve 232 is operated and controlled by a cam 250 held by a set screw 251 to the overhanging end 128, of the power drive shaft 70, that drives the table indexing mechanism and the olive positioner and thus functions in timed relation thereto. This cam is best seen in Figs. 2 and 10 and the latter figure shows the cam in relation to the cam roller 246 of the valve stem 240 when the valve is closed, the arrow in this figure indicating the direction of rotation of the cam. It will be observed that the cam has the general shape of a segment of a circle and has a continuous cam track consisting of the side faces 252 and 254 which connect with a curved face 256 defined by an arc having its center at the axis of the cam. In operation of the cam the face 252 will engage the roller 246 of the valve stem 240 and raise the stem against the valve spring to open the valve. When the curved face 256 of the cam contacts the roller 246 the valve will be fully opened and the valve will stay open during the entire time its roller is engaged by this face. As the face 254 starts engaging the roller 246 the valve stem will lower to close the valve and the valve will be entirely closed when the cam face leaves contact with the roller. During the interval while the cam is out of engagement with the roller 246 the valve will remain closed.

In operation of the present apparatus it is preferred that the cam 250 be set to open the valve 232 when the olive positioner is lowered to a position relative to the olive holding cups 40 shown in Fig. 7 that the tips 218 of the positioner orienting and delivery tubes 192 will retain contact with the olives until they are substantially seated in the cups. In this way there is no shifting of the olives from their oriented position during transfer from the tubes to the cups. It is also desirable that the face 252 of the cam be shaped to quickly open the valve whereby the compressed air rapidly enters the feeding box chambers to close the flap valves 172. Also, the face portion 256 of the cam should be preferably long enough to maintain a flow of compressed air into the tubes until after the olives have been deposited in the cups and the olive positioner has been substantially retracted to its up position.

It will be understood that any suitable means may be provided for supplying individual olives to the compartments of the hopper 88. For instance, the olives may be introduced by hand or by a suitable device (not shown) positioned over the olive positioner. Preferably, the manual or mechanical feeding will be in timed relation with the oliver positioner so that individual olives are simultaneously dropped into each of the hopper compartments while the positioner is being lowered into position over the olive holding cups but before compressed air is admitted to the feeding box chambers.

The apparatus of the present invention operates as follows: An operator or a device for supplying individual olives is positioned relative to the hopper 88 of the olive positioner to operate in timed relation thereto and is furnished with a supply of olives to be pitted and power is transmitted to the several instrumentalities from the motor 44 through the shafts 56, 70, 80 and 118. Assuming that a group of empty olive holding cups have been indexed by the table 34 below the olive positioner and are held stationary, the olive positioner will then be in up position shown in Fig. 4. The cam roller 130 of the rocker frame 92 of the positioner will now enter the depressed face 140 of the cam 114 and will start lowering the olive positioner over the olive holding cups 40. At this time the air valve 232 will be closed, the valve cam roller 246 will be disengaged from the valve cam 250 and the flap valve 172 of the feeding box chambers 154 will be in the position shown in Figs. 5 and 6. While the positioner is being lowered the olive supply operator or device will drop a single olive into each compartment 166 of the hopper 88, no attention being given to the angularity of the major axis of the olives in this operation. Each olive falls by gravity from the hopper compartment 166 through the opening 170 into the feeding box chamber 154 and then through the opening 188 into the orienting tube 192 where it lodges itself in the position received therein, for instance, that illustrated by the olive 216 in Fig. 7. When the rocker arm cam roller 130 is in the bottom of the space 140 of the cam 114 the olive positioner will have been lowered to the position shown in Fig. 7. When this position is reached the air valve cam face 252 will engage the valve stem roller 246, quickly raising the valve stem to open the valve 232 and admit compressed air into the hose lines 226 communicating with the inlet passages 220 of the feeding box chambers 154. Air will flow rapidly into the chambers and will strike the flap valves 172 which being pivoted at their upper edge will immediately swing upwardly to the position shown in Fig. 7 to close the openings 170 between the hopper compartments and the chambers, and thus maintain air under pressure in the feeding box compartments 154. The air now acts upon the olives in the orienting tubes forcing the same through the tubes past the constricted portion thereof while the wall thereof tends to contact the smallest diameter of the olives and gradually turns them so that they finally leave the tubes with their major axis paralleling the axis of the tubes and are received in the holding cups in the same position such being a vertical one in the present embodiment. At this point, the cam 114 starts to raise the olive positioner, the compressed air continuing to flow until the tips 218 of the orienting tubes leave the olives and the positioner is fully retracted to its up position, at which time the valve cam 250 will leave the roller 246 of the valve stem and the valve will close, thus shutting off the supply of air. The flap valves 172 of the feeding box chambers will now drop to their normal vertical position shown in Figs. 5 and 6 leaving the openings 170 free for the introduction of further olives into the chambers 154. Also the cups 40 with their charges of vertically positioned olives will now index to the preliminary incising position of the olive pitting apparatus and a new group of empty holding cups will be brought into position below the olive positioner and another cycle of operation will be resumed.

It is to be observed that a further advantage of the present invention is that the olives are firmly pressed into the holding cups 40 so that they will not be shifted from their oriented position in the cups during subsequent movement of the latter, as when indexing the table 34. Thus, as best seen in Fig. 7, the holding cups 40 are preferably provided with a cavity or pocket 258 that tapers inwardly. When the olives are propelled into the cups under the action of adequate fluid pressure such as previously described, they will become more or less wedged in the pockets of the cups without being substantially marred and will be firmly held therein.

While the particular method and apparatus herein described is well adapted for carrying out the objects of the present invention it will be understood that various modifications, changes and substitutions may be made without departing from the spirit thereof and the present invention is to be construed to include all such modifications, changes and substitutions as may come within the scope of the following claims:

What I claim as new and desire to protect by Letters Patent is:

1. An apparatus for feeding and orienting generally ovoidal-shaped objects comprising an elastic tube having an open end for the reception of such an object with its major axis in any angular direction and having an annular passageway of such dimension as to require dilation of the tube in order to permit the object to pass therethrough with its major axis coincident with said passageway, and means for applying fluid pressure into the open end of said tube behind such an object lodged therein to force the object through the tube and eject it therefrom.

2. An apparatus for feeding and orienting a generally ovoidal-shaped object with its major axis in a predetermined position, comprising a tubular member for the reception of the object, said member having an entrance portion of sufficient size to receive the object in any position and having a dilatable throat portion of smaller dimension than the object to require dilation thereof by the object when the latter is passed therethrough, and means for applying fluid pressure into said tubular member behind the object when passed into the entrance portion thereof to force the object through said throat portion and eject it from said member in the predetermined position.

3. An apparatus for feeding and orienting generally ovidal-shaped objects comprising an open ended elastic tube for the reception of such an object, said tube having a passageway larger at one end than at the other, the larger end being of greater size than the major axis of the object to enable the object to be lodged therein in any position and the smaller end being of smaller size than the minor axis of the object as to require dilation of the tube to permit the object to pass therethrough, and means for applying fluid pressure into said tube behind such an object lodged therein to force the object through the tube and eject it therefrom.

4. An apparatus for feeding and orienting generally ovoidal-shaped objects comprising an elastic tube having an open upper end for the reception of such an object by gravity and converging into a passageway having a portion requiring dilation in order to permit the object to pass therethrough, and means for applying fluid pressure into said tube behind such an object lodged therein to force the object through the tube and eject it therefrom.

5. An apparatus for feeding and orienting generally ovoidal-shaped objects comprising an open ended elastic tube for the reception of such an object, said tube having a frusto-conical passageway into the larger end of which the object may be introduced without dilation of the tube, the smaller end being of restricted size such as to require dilation of the tube in order to permit the object to pass therethrough, and means for applying fluid pressure into said tube behind such an object lodged therein to force the object through the tube and eject it therefrom.

6. An apparatus for feeding and orienting generally ovoidal-shaped objects comprising an elongated open ended tapered tube having a portion normally sufficiently large to receive such an object and having another portion normally too small to pass such an object without dilation of said portion, said tube having a relatively thin wall of elastic material soft enough to permit said small portion of the tube to be dilated to pass the object but stout enough to prevent bursting of the tube during passage of the object, and means for applying fluid pressure into said tube behind such an object lodged therein to force the object through said tube and eject it therefrom.

7. An apparatus for feeding and orienting generally ovoidal-shaped objects comprising a feeding box having a chamber, an expansible orienting means communicating with said chamber, said orienting means having a passageway of such dimension as to require dilation of said means in order to permit such an object to pass therethrough, means for admitting such an object to said orienting means through said chamber, and means for admitting fluid under pressure into said chamber and behind such an object for propelling the object through said orienting means.

8. An apparatus for feeding and orienting generally ovoidal-shaped objects comprising a feeding box having a chamber, said box having an opening for admitting such an object to said chamber, means for closing the opening in said chamber, an elastic tube communicating with said chamber, said tube having a passageway of such dimension as to require dilation of the tube in order to permit the object to pass therethrough, and means for admitting fluid under pressure into said chamber behind such an object to operate said closing means to close said opening and to force the object through said tube and eject it therefrom.

9. An apparatus for feeding and orienting generally ovoidal-shaped objects, comprising a feeding box having a chamber, said box having an opening for admitting such an object to said chamber, a normally open closure pivotally mounted adjacent said opening, an orienting tube communicating with said chamber, said tube having an elastic portion normally too small for passage of such an object without dilation of said portion, and means including an air inlet for admitting air under pressure into said chamber for actuating said closure to close said opening and for forcing the object through said orienting tube.

10. An apparatus for feeding and orienting generally ovoidal-shaped objects, comprising a feeding box having a chamber, said box having an opening for admitting such an object to said chamber, means for closing the opening in said chamber, an elastic orienting tube communicating with said chamber for receiving the object therefrom, said tube having a passageway of such dimension as to require dilation of the tube in order to permit the object to pass therethrough, and means for admitting fluid under pressure into said chamber behind the object to operate said closing means to close the opening in said chamber and to force the object through said tube, including a fluid inlet communicating with said chamber, a valve for controlling flow of fluid to said inlet and means for controlling said valve.

11. An apparatus for feeding and orienting generally ovoidal-shaped objects, comprising a hopper to receive such an object, a feeding box having a chamber, said box having an opening communicating with the bottom of said hopper from said chamber and through which the object may pass into said chamber, an inlet for admitting air under pressure into said chamber, a closure member pivotally suspended adjacent said inlet and adapted to be swung upwardly to close said opening when an object has been admitted to said chamber, an expansible orienting tube communicating with said chamber opposite said opening and adapted to receive an object from said chamber and having a constricted portion for obstructing normal passage of such an object, an air valve communicating with said inlet, and means for opening said air valve to admit air into said chamber for actuating said closure member to close said opening and for propelling an object in said chamber through the constricted portion of said orienting tube.

12. An apparatus for feeding and orienting generally ovoidal-shaped objects, comprising a feeding box having a chamber, a fluid inlet communicating with said chamber for admitting fluid under pressure therein, an opening in said chamber through which such an object may be received in said chamber, a gate for closing said opening, and an expansible orienting means communicating with said chamber to receive an object therefrom and having a constricted opening through which the object may leave said chamber for righting said object with its major axis in axial alignment with said constricted opening when fluid pressure is admitted to said chamber.

13. An apparatus for feeding and orienting generally ovoidal-shaped objects, comprising an elastic tube having one end open for the reception of such an object disposed in any angular direction, said tube having a passageway at its opposite end of such dimension as to require dilation of the tube in order to permit the object to pass therethrough, means for applying fluid pressure into the receiving end of said tube behind such an object lodged therein to force the object through said tube and means substantially encompassing said tube for preventing excessive ballooning of said tube by the force of said fluid pressure as resisted by the object.

14. An apparatus for feeding and orienting generally ovoidal-shaped objects, comprising a feeding box having a chamber, an opening in said box through which such an object may be admitted to said chamber, an elastic frustro-conical tube communicating with said chamber, an air inlet to admit air under pressure into said chamber behind such an object received therein to force the object through said tube, means actuated by said air to close and seal said opening in said chamber when the object has been admitted thereto, and a second tube surrounding said elastic tube for preventing bursting of said elastic tube when air is admitted to said chamber to force the object through said tube.

15. An apparatus for feeding and orienting generally ovoidal-shaped objects including a receptacle for receiving the object in a predetermined position, comprising an open ended elastic tube for the reception of such an object to be positioned, said tube having a passageway of such dimension as to require dilation of said tube in order to permit the object to pass therethrough, means for movably supporting said tube, means for moving said tube into and out of object discharge position relative to said receptacle, said discharge position being such that the object upon discharge is received into said receptacle before leaving contact with said tube and in the same relation with respect to its major axis as it is discharged by said tube, means for conducting fluid under pressure into said tube behind an object lodged therein to force the object through said tube and into said receptacle, and means for admitting fluid under pressure into said fluid conducting means when said tube is in discharge position and for maintaining the flow thereof into said means until the object has been discharged from said tube and said tube has been moved out of contact with the object discharged therefrom.

16. The method of feeding and orienting generally ovoidal-shaped objects, comprising gravitally feeding such objects one at a time into an expansible passage constricted to a diameter smaller than the minor axis of the object, and applying a uniform surface pressure behind the object to urge it through said passage thereby subjecting the object to a turning moment as it passes through said passage to position said object with its major axis concentric relative to said passage.

17. An apparatus for feeding and orienting generally ovoidal-shaped objects comprising a feed hopper having a chamber, orienting means associated with said chamber and having a passageway communicating therewith of such dimension as to receive the object haphazardly from said chamber and having an expansible portion requiring dilation in order to permit the object to pass therethrough, and means for admitting fluid under pressure into said chamber for propelling the object through said orienting means.

18. An apparatus for feeding and orienting generally ovoidal-shaped objects, comprising a feeding box having a chamber and having an opening through which such an object may be admitted to said chamber, an elastic frusto-conical tube communicating with said chamber, an air inlet to admit air under pressure into said chamber behind the object received therein to force the object through said tube, means actuated by said air to close and seal the opening in said chamber when the object has been admitted thereto, and means for limiting the expansion of said tube to prevent bursting thereof when air is admitted to said chamber.

19. An apparatus for depositing a generally ovoidal-shaped object into a holding receptacle with the major axis of the object substantially aligned with the axis of said receptacle, comprising a movable resilient tube and having an entrance opening of sufficient size to receive the object in any position and having a dilatable passage for obstructing normal movement of the object through said tube, means for moving said tube into a position relative to the receptacle with the axis of said passage substantially coincident to the axis of said receptacle, means for applying pressure to the object to force the latter through the passage thereby imparting a turning moment to the object in its progress through said passage to turn the object into a position with its major axis paralleling the axis of said passage as the object passes therethrough whereby to discharge the object in oriented position into said receptacle, and means for withdrawing the tube from the receptacle while pressure is applied to the object to prevent displacement of the latter in said receptacle.

20. An apparatus for feeding fruit or the like to a holding receptacle having an inwardly tapered pocket into which the fruit is to be wedged, comprising a movable passage for delivering fruit to said receptacle, means for moving the passage relative to said receptacle whereby the fruit will be received in said receptacle pocket before it entirely leaves said passage, and means for propelling the fruit through said passage to discharge the fruit therefrom and wedge it in said receptacle pocket.

21. In an apparatus for feeding fruit or the like to a holding receptacle having an inwardly tapered pocket into which the fruit is to be wedged, movable orienting means having an open ended passage for delivering the fruit to said receptacle, means for moving the orienting means into a position relative to said receptacle such that an end of the fruit will be substantially seated in said tapered pocket before the entire fruit leaves said passage, means for admitting fluid under pressure into said orienting means for propelling the fruit therethrough to orient the fruit and to discharge the latter from said passage and wedge it in said receptacle pocket, and means for withdrawing the orienting means out of said position in relation to said receptacle during continued admission of fluid under pressure to prevent displacement of the fruit in the receptacle pocket.

22. The method of positioning generally ovoidal-shaped objects comprising feeding the object into an expansible passage constricted to a diameter smaller than the minor axis of the object, and subjecting the object to confined fluid pressure to propel it through said passage whereby to dilate the passage and to orient the object with its major axis substantially parallel to the direction of travel of the object.

23. An apparatus for feeding and orienting generally ovoidal-shaped objects comprising a chamber, orienting means associated with said chamber and having a passageway communicating therewith of such dimension as to receive the object haphazardly from said chamber and including an expansible portion requiring dilation in order to permit the object to pass therethrough, and means for admitting fluid under pressure into said chamber for propelling the object through said orienting means.

GEORGE NORTON HEIN.

---

CERTIFICATE OF CORRECTION.

Patent No. 2,372,325.                                               March 27, 1945.

GEORGE NORTON HEIN.

It is hereby certified that error appears in the printed specification of the above numbered patent requiring correction as follows: Page 4, first column, line 63-64, after "lubricating" insert the word --due--; and that the said Letters Patent should be read with this correction therein that the same may conform to the record of the case in the Patent Office.

Signed and sealed this 27th day of November, A. D. 1945.

Leslie Frazer
(Seal)                          First Assistant Commissioner of Patents.

sage and wedge it in said receptacle pocket, and means for withdrawing the orienting means out of said position in relation to said receptacle during continued admission of fluid under pressure to prevent displacement of the fruit in the receptacle pocket.

22. The method of positioning generally ovoidal-shaped objects comprising feeding the object into an expansible passage constricted to a diameter smaller than the minor axis of the object, and subjecting the object to confined fluid pressure to propel it through said passage whereby to dilate the passage and to orient the object with its major axis substantially parallel to the direction of travel of the object.

23. An apparatus for feeding and orienting generally ovoidal-shaped objects comprising a chamber, orienting means associated with said chamber and having a passageway communicating therewith of such dimension as to receive the object haphazardly from said chamber and including an expansible portion requiring dilation in order to permit the object to pass therethrough, and means for admitting fluid under pressure into said chamber for propelling the object through said orienting means.

GEORGE NORTON HEIN.

---

CERTIFICATE OF CORRECTION.

Patent No. 2,372,325.    March 27, 1945.

GEORGE NORTON HEIN.

It is hereby certified that error appears in the printed specification of the above numbered patent requiring correction as follows: Page 4, first column, line 63-64, after "lubricating" insert the word --due--; and that the said Letters Patent should be read with this correction therein that the same may conform to the record of the case in the Patent Office.

Signed and sealed this 27th day of November, A. D. 1945.

Leslie Frazer
(Seal)    First Assistant Commissioner of Patents.